(12) United States Patent
Nakamura

(10) Patent No.: US 6,195,753 B1
(45) Date of Patent: Feb. 27, 2001

(54) INFORMATION PROCESSING APPARATUS WITH REDUCED POWER CONSUMPTION

(75) Inventor: Yousuke Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/093,104

(22) Filed: Jun. 8, 1998

(30) Foreign Application Priority Data

Jun. 9, 1997 (JP) .................................................. 9-150665

(51) Int. Cl.[7] ....................................................... G06F 1/08
(52) U.S. Cl. ........................ 713/322; 713/320; 713/321; 713/323; 713/324
(58) Field of Search ............................ 712/322; 713/300, 713/310, 320–324

(56) References Cited

U.S. PATENT DOCUMENTS 5,418,969 * 5/1995 Matsuzaki et al. .................. 713/322
5,634,131 * 5/1997 Matter et al. ........................ 713/322

FOREIGN PATENT DOCUMENTS 63-26716    2/1988  (JP) .
3-10306     1/1991  (JP) .

* cited by examiner

Primary Examiner—Meng-Ai T. An
Assistant Examiner—Wen-Tai Lin
(74) Attorney, Agent, or Firm—Ostrolenk, Faber, Gerb & Soffen, LLP

(57) ABSTRACT

An information processing apparatus includes an instruction memory, an instruction register, a plurality of function blocks, an instruction/state decoder, and a clock supply/stop circuit. The instruction memory stores instructions. An instruction is loaded from the instruction memory into the instruction register. The function blocks perform a basic operation required for execution of the instruction. The instruction/state decoder decodes the instruction read out from the instruction register, and also decodes a control signal used for notification of a state between the function blocks. The clock supply/stop circuit supplies a clock signal to a function block, of the plurality of function blocks, which is required for execution of the decoded instruction and needs to operate, on the basis of an output signal from the instruction/state decoder.

6 Claims, 3 Drawing Sheets

INFORMATION PROCESSING APPARATUS WITH REDUCED POWER CONSUMPTION

BACKGROUND OF THE INVENTION

1. Field of the Invention

The present invention relates to an information processing apparatus and, more particularly, to an information processing apparatus having a power control function.

2. Description of the Prior Art

An information processing apparatus such as a microprocessor having a power saving control function has been known (Japanese Unexamined Patent Publication Nos. 63-26716 and 3-10306). FIG. 1 is a circuit diagram showing an overall arrangement of this conventional information processing apparatus. In the conventional information processing apparatus, an instruction designated by a program counter 1 is loaded from an instruction memory 2 into an instruction register 3 in synchronism with a clock CL1. An instruction decoder 4 decodes the instruction loaded into the instruction register 3. As a result, a function block selection signal associated with the execution of the instruction is activated in synchronism with a clock CL2.

The logic of each active output signal from the instruction decoder 4 is inverted by a corresponding one of inverters 5a to 5n. Each inverted signal is then input to one input terminal of a corresponding one of two-input AND circuits 6a to 6n. Meanwhile, a clock CL3, for determining the operation timing of each function block, is commonly input to the other input terminal of each of the two-input AND circuits 6a to 6n through a buffer 10.

The output signals from the two-input AND circuits 6a to 6n are respectively supplied to function blocks 8a to 8n through buffers 7a to 7n arranged in correspondence with the two-input AND circuits 6a to 6n. With this connection, the clock CL3 is supplied to only the function block, of the function blocks 8a to 8n, which is used for each instruction, but the remaining function blocks that are not used do not operate. This can reduce the overall power consumption.

Although not described in the above reference, each of the function blocks 8a to 8n does not operate singly, and the respective function blocks operate in association with each other in the actual information processing apparatus. For this reason, the apparatus uses a inter-function-block control signal 9. The operation of the inter-function-block control signal 9 will be described for a case where the contents of the memory are loaded into the instruction register. In this case, a register circuit and a memory access circuit serve as function blocks.

When an instruction is decoded, a clock is supplied to these two function blocks to start the operation. The memory access circuit as one function block outputs a memory read request to the outside of the information processing apparatus, waits for a response from the outside, and receives data. The memory access circuit then writes the data in the register by using the register circuit as the other function block. In this case, memory access depends on the external state (for example, in the case of a dynamic random access memory (DRAM), no response is received during memory refresh operation).

The memory access circuit must therefore keep operating (monitoring) to prepare for the reception of data at any moment. The memory access circuit must also notify the register circuit that the data has been received (or will be received). The inter-function-block control signal 9 includes a control signal for the notification of such a state between these function blocks.

An information processing apparatus using a semiconductor device takes two types of circuit arrangements, namely a static circuit and a dynamic circuit. The static circuit establishes a stable state by using transistors, and stably operates independently of the clocks. The dynamic circuit uses interconnection capacitances. More specifically, this dynamic circuit uses the charge stored in the capacitances to suppress the number of transistors to be used, thereby attaining a high integration degree. Since the dynamic circuit uses the charge in the interconnection capacitances, the circuit stops operating a given period of time after the charge is discharged. For this reason, the dynamic circuit has a lower operating frequency limit.

In the above conventional information processing apparatus, clock control on the respective function blocks is determined by only decoding of instructions, but does not depend on the internal state of respective function blocks. For this reason, unnecessary function blocks may operate to consume excess power. In the above case of memory read access, the register function block in the memory access completion wait state is an unnecessary block.

In the information processing apparatus having the semiconductor circuit using the dynamic circuit, because of the lower operating frequency limit described above, when the clock is completely stopped, the internal state of a function block changes. As a result, the block may not operate properly.

SUMMARY OF THE INVENTION

The present invention has been made in consideration of the above problems in the prior art, and has as its object to provide an information processing apparatus which can attain a reduction in power consumption as compared with the prior art by stopping unnecessary function blocks from consuming power.

In order to achieve the above object, according to the first aspect of the present invention, there is provided an information processing apparatus comprising an instruction memory for storing an instruction, an instruction register in which the instruction in the instruction memory is loaded, a plurality of function blocks for performing a basic operation required for execution of the instruction, an instruction/state decoder for decoding the instruction read out from the instruction register, and also decoding a control signal for notification of a state between the function blocks, and a clock supply/stop circuit for supplying a clock to only a function block, of the plurality of function blocks, which is required for execution of the decoded instruction and needs to operate, on the basis of an output signal from the instruction/state decoder.

In the first aspect, since a control signal for the notification of a state between function blocks is fed back to the instruction/state decoder, a clock for controlling the operation of each function block is supplied to each function block to cause it to operate, on the basis of the result obtained by decoding an instruction and an inter-function-block control signal, only when each function block must truly operate.

According to the second aspect of the present invention, there is provided an information processing apparatus comprising an instruction memory for storing an instruction, an instruction register in which the instruction in the instruction memory is loaded, a plurality of function blocks for performing a basic operation required for execution of the instruction, an instruction/state decoder for decoding the instruction read out from the instruction register, and also decoding a control signal for notification of a state between the function blocks, a plurality of clock generators for generating first and second clocks having different frequencies, and a clock supply/stop circuit for supplying the first clock having a high frequency to only a function block, of the plurality of function blocks, which is required for execution of the decoded instruction and needs to operate, and supplying the second clock having a low frequency to a function block which need not operate, on the basis of an output signal from the instruction/state decoder.

In the second aspect, when each function block must truly operate, the first clock is input to cause it to operate. When each function block need not operate, the second clock is input to it. By setting the second clock to the lower operating frequency limit of the circuit, dynamic circuits can be used to form each function block.

According to the present invention, a clock for controlling the operation of each function block is supplied to the function block to cause it to operate, on the basis of the result obtained by decoding an instruction and an inter-function-block control signal, only when each function block must truly operate. The power consumption can therefore be reduced even in the execution of one instruction. This greatly reduces the power consumption as compared with the prior art.

In addition, according to the present invention, when each function block must truly operate, the first clock is input to it to cause it to operate. When each function need not operate, the second clock is input to it. With this operation, dynamic circuits can be used by forming each function block using a dynamic circuit and setting the second clock to the lower operating frequency limit of the dynamic circuit. For this reason, a reduction in power consumption can be attained. In addition, an increase in integration degree can be attained because of the use of the dynamic circuits. An information processing apparatus with higher performance can therefore be implemented on a semiconductor device.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF THE PREFERRED EMBODIMENTS

A few preferred embodiments of the present invention will be described in detail below with reference to the accompanying drawings.

Figure 1:
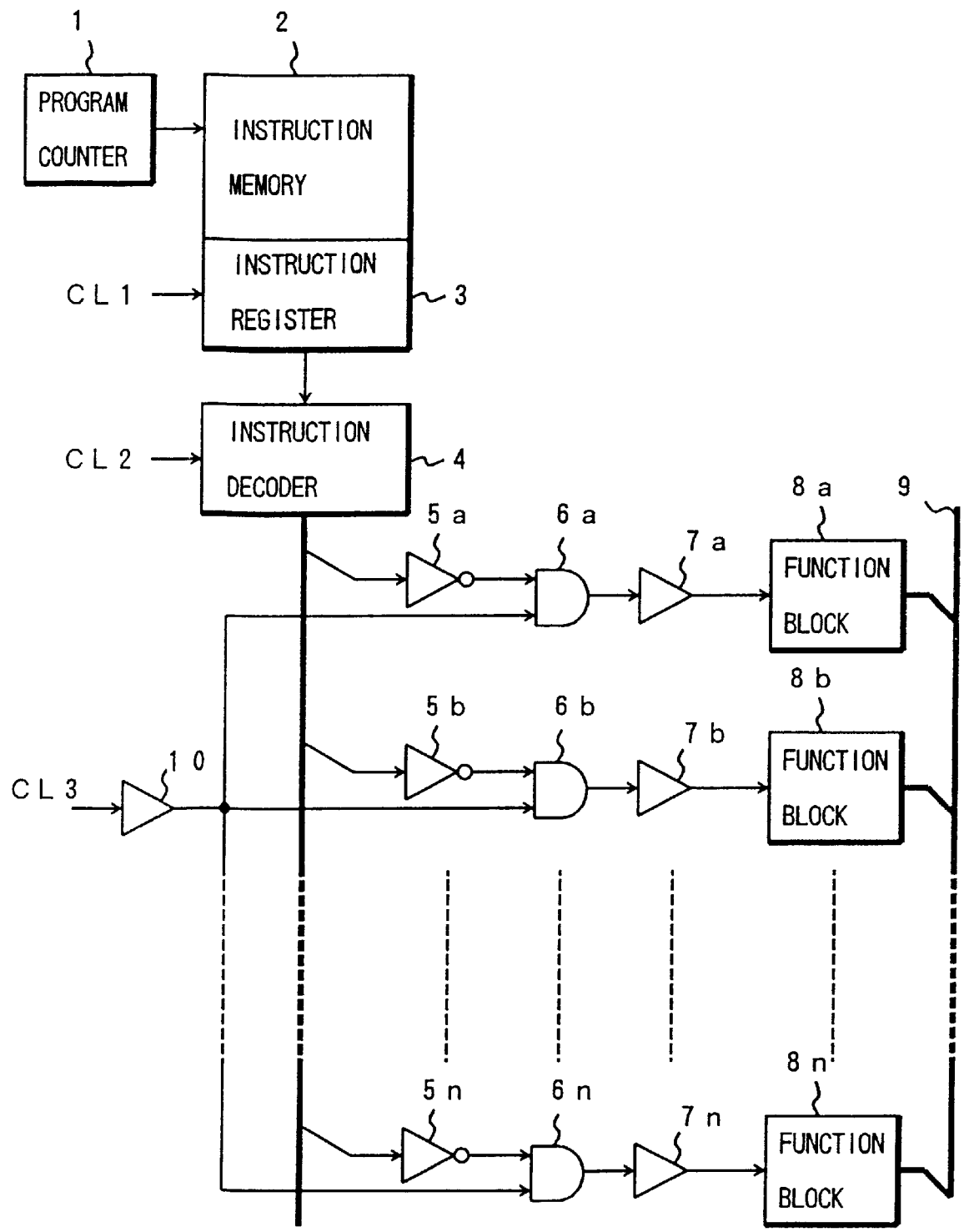
FIG. 1 is a circuit diagram showing an overall arrangement of a conventional information processing apparatus.
Figure 2:
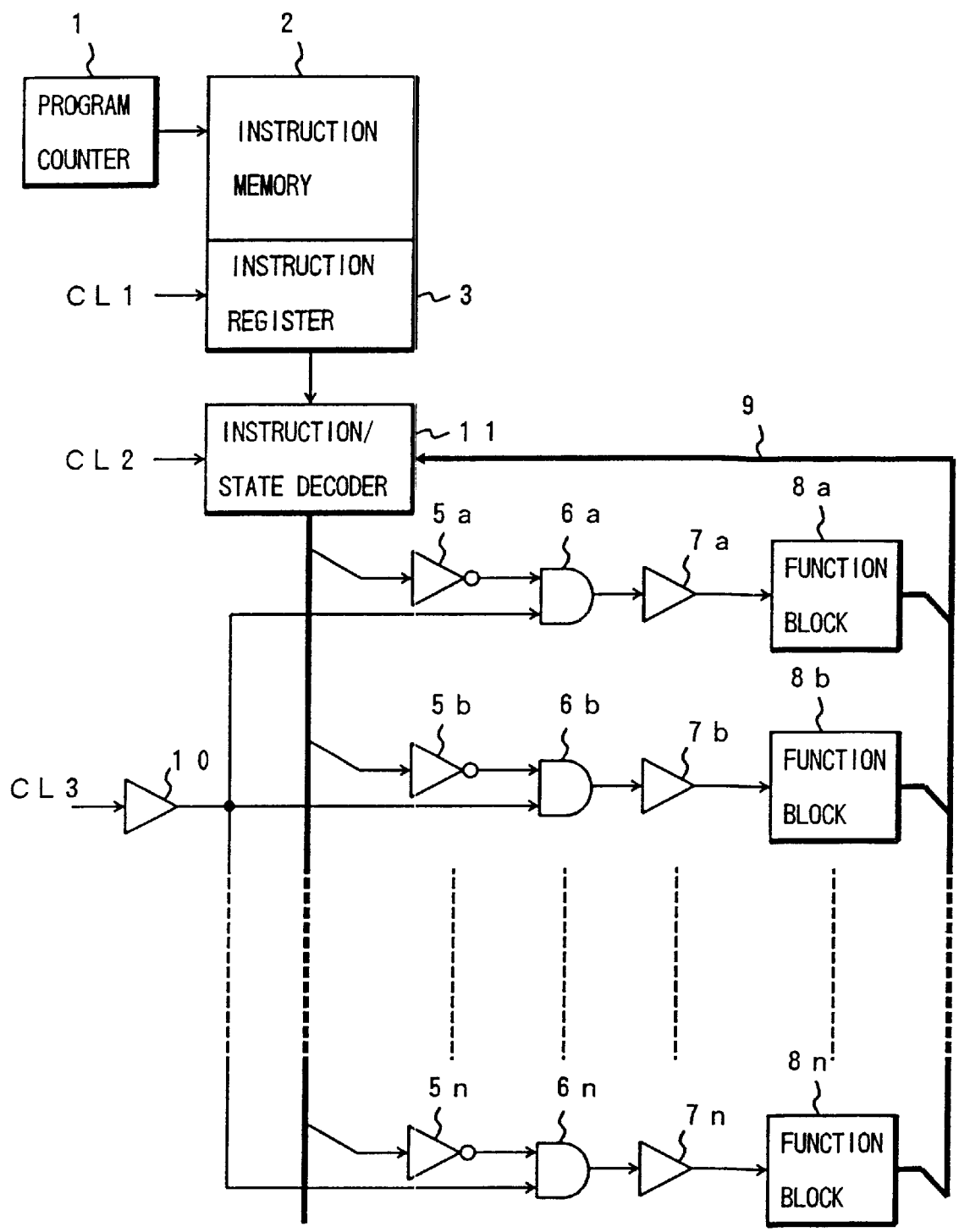
FIG. 2 is a circuit diagram showing an overall arrangement of the first embodiment of the present invention.

FIG. 2 is a circuit diagram showing an overall arrangement of an information processing apparatus according to the first embodiment of the present invention. The same reference numerals in FIG. 2 denote the same parts as in the prior art shown in FIG. 1. Referring to FIG. 2, this embodiment is characterized in that an instruction/state decoder 11 is used in place of the instruction decoder 4 in the prior art, and an inter-function-block control signal 9 is connected as an input to the instruction/state decoder 11.

The operation of this embodiment will be described in the case wherein the contents of the above memory are loaded into the instruction register. The embodiment includes a register circuit and a memory access circuit as function blocks. When an instruction is decoded by the instruction/state decoder 11, a clock is supplied first to the function block as the memory access circuit. The memory access circuit then starts operating.

The memory access circuit outputs a memory read request to the outside of the information processing apparatus, and waits for a response from the outside. When the memory access circuit receives data (or will receive data) afterward, the memory access circuit notifies the register circuit of the reception of the data. Since this notification is included in the inter-function-block control signal 9, the instruction/state decoder 11 reads the above notification by decoding the inter-function-block control signal 9.

Upon reading this notification, the instruction/state decoder 11 supplies a clock to the register circuit to operate it, thereby writing the data received by the memory access circuit in the register circuit. The clock is supplied/stopped by a circuit section constituted by inverters 5a to 5n and AND circuits 6a to 6n as in the prior art.

In this embodiment, since the clock is supplied/stopped in accordance with the internal state of each function block which is decoded by the instruction/state decoder 11, the supply of the clock to the register circuit in a memory access completion wait state can be stopped. This can attain a reduction in power consumption as compared with the prior art.

Figure 3:
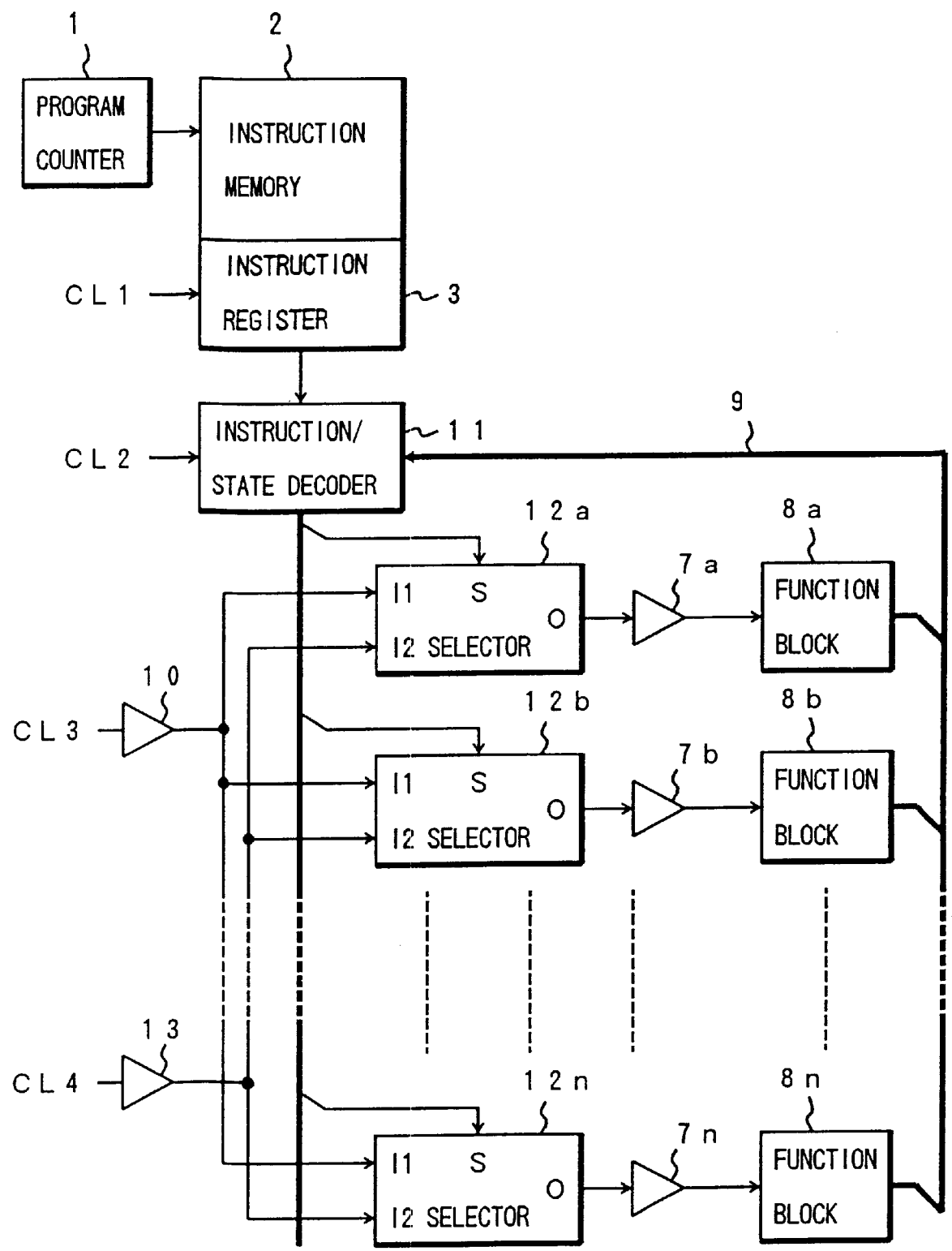
FIG. 3 is a circuit diagram showing an overall arrangement of the second embodiment of the present invention.

FIG. 3 is a circuit diagram showing an overall arrangement of an information processing apparatus according to the second embodiment of the present invention. The same reference numerals in FIG. 3 denote the same parts as in the first embodiment shown in FIG. 2, and a description thereof will be omitted. In the first embodiment shown in FIG. 2, since the supply of a clock is completely stopped, all the function blocks must be static circuits, resulting in a decrease in an integration degree as compared with an apparatus using dynamic circuits.

The second embodiment shown in FIG. 3 includes a means for switching the clock supplied to a function block that need not operate, to a low-frequency clock corresponding to the lower operating frequency limit of the dynamic circuit. Although the basic control is the same as that in the first embodiment, clock supply control on each function block differs from that in the first embodiment.

Referring to FIG. 3, selectors 12a to 12n are arranged in correspondence with function blocks 8a to 8n. Each of the selectors 12a to 12n is designed such that when a selection signal input to a selection signal input terminal S is active, an input signal coupled to a first input terminal I1 is output to an output terminal O, whereas when the selection signal is inactive, an input signal coupled to a second input terminal I2 is output to the output terminal O.

A clock CL3 is commonly input to the first input terminals I1 of the selectors 12a to 12n through a buffer 10. A clock CL4 is commonly input to the second input terminals I2 of the selectors 12a to 12n through a buffer 13. In this case, the clock CL4 is set to a frequency equal to the lower operating frequency limit of the dynamic circuit. The frequency of the clock CL4 is lower than that of the clock CL3.

Upon reception of an instruction from instruction register 3 and inter-function-block control signal 9, instruction/state decoder 11 supplies the high-speed clock CL3 or the low-speed cock CL4 to each function block 8a . . . 8n that needs to operate through a selector 12a . . . 12n. With this operation, although the power consumption slightly increases as compared with the first embodiment, dynamic circuits can be used, and an increase in integration degree can be attained. An information processing apparatus with higher performance can therefore be implemented on a semiconductor device.

What is claimed is:

1. An information processing apparatus comprising:

an instruction memory which stores at least one instruction;

an instruction register which receives one of said instructions from said instruction memory;

a plurality of function blocks, at least a one of said function blocks being a select function block able to perform an operation required for execution of said instruction, each function block producing a respective control signal indicative of whether another select function block should be enabled;

an instruction/state decoder which receives said instruction from said instruction register, receives said control signals and outputs an output control signal in, response thereto; and a clock supply circuit which receives said output control signal and, in responses to said output control signal, selectively couples a first clock to said select function block to perform the operation required for execution of said instruction.

2. An information processing apparatus comprising:

an instruction memory which stores at least one instruction;

an instruction register which receives at least one of said instructions from said instruction memory;

a plurality of function blocks, at least one of said function blocks being a select function block able to perform an operation required for execution of said instruction, each function block producing a respective control signal indicative of whether another select function block should be enabled;

an instruction/state decoder which receives said instruction from said instruction register, receives said control signals, and outputs an output control signal in response thereto;

a plurality of clock generators which generate first and second clocks, respectively, said first clock having a higher frequency than said second clock; and a clock supply circuit which receives said output control signal and, in response to said output control signal, selectively couples said first clock to said select function block and couples said second clock to all of said function blocks except for said select function block to perform the operation required for execution of said instruction.

3. An apparatus according to claim 2, wherein at least one of said function blocks is formed by a dynamic circuit, and said second clock is set to a lower operating frequency limit of said dynamic circuit.

4. An apparatus according to claim 2, wherein said clock supply circuit comprises a plurality of selectors, each selector having a first, second and third input and an output, said first input being coupled to said instruction/state decoder, said second input being coupled to said first clock, said third input being coupled to said second clock, and said output being coupled to a single one of said function blocks.

5. The information processing apparatus as claimed in claim 1, wherein said clock supply circuit comprises:

a plurality of AND gates, each of said AND gates having at least a first and second input and an output; wherein said first input is coupled to said instruction/state decoder;

said second input is coupled to said clock; and said output is coupled to a single one of said function blocks.

6. The information processing apparatus as claimed in claim 1, wherein said clock supply circuit couples a second clock to all of said function blocks except for said select function blocks.

* * * * *